(12) United States Patent
Lin

(10) Patent No.: US 11,222,080 B2
(45) Date of Patent: Jan. 11, 2022

(54) GUIDANCE CONTENT AUTOMATIC OBTAINING AND DISPLAYING EQUIPMENT

(71) Applicant: INTEGRAL SEARCH INTERNATIONAL LIMITED, Taipei (TW)

(72) Inventor: Chih-Ching Lin, Taipei (TW)

(73) Assignee: INTEGRAL SEARCH INTERNATIONAL LIMITED, Taipei (TW)

(*) Notice: Subject to any disclaimer, the term of this patent is extended or adjusted under 35 U.S.C. 154(b) by 36 days.

(21) Appl. No.: 16/588,888

(22) Filed: Sep. 30, 2019

(65) Prior Publication Data

US 2020/0125605 A1   Apr. 23, 2020

(30) Foreign Application Priority Data

Oct. 23, 2018   (TW) .................................. 107137426

(51) Int. Cl.
  *G06F 17/10*   (2006.01)
  *G06F 16/93*   (2019.01)
  *G06Q 50/18*   (2012.01)
  *G06F 40/14*   (2020.01)

(52) U.S. Cl.
  CPC .............. *G06F 16/93* (2019.01); *G06F 40/14* (2020.01); *G06Q 50/184* (2013.01)

(58) Field of Classification Search
  CPC ........ G06Q 50/184; G06F 16/93; G06F 40/14
  See application file for complete search history.

(56) References Cited

U.S. PATENT DOCUMENTS

| | | | | |
|---|---|---|---|---|
| 5,297,039 | A * | 3/1994 | Kanaegami | G06F 16/3344 |
| 5,774,833 | A * | 6/1998 | Newman | G06F 40/30 |
| | | | | 704/9 |
| 10,216,993 | B2 * | 2/2019 | Jong | G06K 9/00456 |
| 2011/0307499 | A1 * | 12/2011 | Elias | G06F 16/358 |
| | | | | 707/750 |
| 2014/0317097 | A1 * | 10/2014 | Elias | G06F 16/313 |
| | | | | 707/722 |
| 2016/0048936 | A1 * | 2/2016 | Perkowski | G06Q 50/184 |
| | | | | 705/310 |
| 2018/0137194 | A1 * | 5/2018 | Lundberg | G06F 16/40 |
| 2018/0157665 | A1 * | 6/2018 | Lundberg | G06F 16/2455 |
| 2020/0265612 | A1 * | 8/2020 | Tsai | G06F 16/5846 |

* cited by examiner

*Primary Examiner* — Shahid K Khan
(74) *Attorney, Agent, or Firm* — Maschoff Brennan

(57) ABSTRACT

Disclosed is a guidance content automatic obtaining and displaying equipment, comprising an illustration data guidance content obtaining device, a illustration data displaying device and a guidance content displaying device in such a manner that, by utilizing a processor, the guidance content is automatically obtained from illustration data of a patent document and is displayed.

7 Claims, 8 Drawing Sheets

| Database Number | Noun-Initial Word | Relative Pronoun | Subordinating Verb | Participle | Preposition | Noun-Initial Word | Relative Pronoun | Participle | Word Separating |
|---|---|---|---|---|---|---|---|---|---|
| 1 | ○ | ● | | | | | | | |
| 2 | ○ | | ● | | | | | | |
| 3 | ○ | | | | | | | | |
| 4 | ○ | | | | ● | | | | |
| 5 | ○ | | | | ○ | | | | |
| 6 | ○ | | | ● | | ○ | | | |
| 7 | ○ | | | ● | | | ○ | | |
| 8 | ○ | | | ● | ● | ○ | ○ | | ○ |
| 9 | ○ | | | | ● | | | | |
| 10 | ○ | | | | ● | | | | |
| 11 | ○ | | | | | | | ○ | |
| 12 | ○ | | | | | | | | ● |

● Word Separating Position  
○ Determination Condition

GUIDANCE CONTENT AUTOMATIC OBTAINING AND DISPLAYING EQUIPMENT

FIELD OF THE INVENTION

The present invention relates to a guidance equipment of a patent document, and more particularly relates to a guidance content automatic obtaining and displaying equipment.

BACKGROUND OF THE INVENTION

Reading a patent document, which requires professional technical understanding and sophisticated technical analysis, is well known as consuming considerable manpower and time. However, there is no auxiliary tool for reading a patent document in a prior art. In particular, there is not a really reading guidance device for assisting people in reading a patent document. For a patent document reader, the reading accuracy and reading speed could not be improved.

In consideration of patent searching, searching operations using several different sets of keywords for several times is required. For each set of keyword, there are often tens of thousands of patent documents obtained. A patent reader is of duty to review each one of such a huge amount of patent documents. We could image the difficulty for a patent reader to digest the huge amount of patent documents. It is also very risky for a patent reader to intuitively comprehend the core technical features of the patent document without any reading tool, especially for untrained patent readers, who read patent document in an inefficient way. For example, a patent professional would not suggest people to read patent documents based on the written sequence thereof, which is not helpful for quickly and accurately understanding the relationship among different patent sections. Even for patent reading experts, they still need to spend considerable time for understanding meaning relationship among reference numerals in drawings if a detailed reading is necessary that a patent reader requires to browse a description content, a claim content or other drawings of the patent document back and forth. Even after this considerable effort and time is taken, any mistakes will easily happen during this complicate procedures such as page turning error or reading miss due to mental inconsistency.

Moreover, no matter of the detail reading or brief reading, patent readers should require a computer assisting tool to help them read a patent document more accurately, fastly and more comfortably. If we put a plurality of sets of searching keywords for one searching operation is considered, the computer assisting tool is absolutely necessary. However, there are not such computer assisting tools for patent reading operation in the prior arts.

Therefore, it is an issue regarding how to provide a convenient and accurate guidance assisting tool for reading a patent document.

SUMMARY OF THE INVENTION

Therefore, an objective of the present invention is to provide a guidance content automatic obtaining and displaying equipment. As shown in FIG. 4 and FIG. 5, the present invention is to automatically obtain a guidance content corresponding to illustration data for the illustration data, including a drawing or a structural patent-claim-graphic, based on the illustration data of patent documents, and display the illustration data and a guidance target of the illustration data such as an element number or an element noun. After reading the illustration data and the guidance target on the same page, the patent readers can select the guidance target of the illustration data so as to display, in the same page or different pages, the guidance content corresponding to the guidance target and the illustration data to patent readers. This method is the most efficient way for patent reading and enables patent readers to read patent quickly, efficiently, and correctly.

In order to solve the abovementioned problem, the present invention provides a guidance content automatic obtaining and displaying equipment that utilizes a processor to automatic obtain a guidance content of illustration data of a patent document to display the guidance content, the patent document content including a claim content, a drawings content, and a description content, the drawing content including at least one drawing, the illustration data being a drawing or a structural patent-claim-graphic, the guidance content being corresponded to a guidance target of the illustration data, the guidance content being a guidance target claim content and/or a guidance target description content and/or a guidance target drawing content, the guidance content automatic obtaining and displaying equipment comprising: an illustration data guidance content obtaining device configured to utilize the processor to obtain the guidance content which corresponds to the guidance target of the illustration data, the guidance content being the guidance target claim content and/or the guidance target description content and/or the guidance target drawing content; an illustration data displaying device configured to utilize the processor to display the illustration data as a displaying graphic and display the guidance target of the illustration data in such a manner that when the illustration data is the drawing, the guidance target is a drawing element number and/or a drawing-corresponding-element-noun which corresponds to the drawing element number, and when the illustration data is the structural patent-claim-graphic, the guidance target is a component element noun and/or an interrelationship and/or a structural graphic element number; and a guidance content displaying device which is connected to the illustration data guidance content obtaining device and the illustration data displaying device, the guidance content displaying device being configured to utilize the processor to display the guidance content which corresponds to the guidance target, and the guidance content being the guidance target claim content and/or the guidance target description content and/or the guidance target drawing content, wherein, by utilizing the processor, the guidance target claim content is obtained by, when the illustration data is the drawing, (1) obtaining a claim element noun of the claims content, based on a word separating rule and a part-of-speech of the claims content, (2) obtaining a description element number which corresponds to the claim element noun from the description content, (3) obtaining a guidance target element number from the guidance target, (4) obtaining a guidance-target-to-description-element-number-relationship between the guidance target element number and the description element number, and (5) obtaining a drawing-to-claim-relationship between the guidance target element number and the claim element noun based on the guidance-target-to-description-element-number-relationship such that the guidance target claim content is obtained, by utilizing the processor, the guidance target claim content, when the illustration data is the structural patent-claim-graphic, is obtained from the claims content by the guidance target of the structural patent-claim-graphic, by utilizing the processor, the guidance target description content, when the illustration data is the drawing, is obtained by the guidance-target-to-description-element-number-relationship between the guidance target element number and the description element number, by utilizing the processor, the guidance target description content, when the illustration data is the structural patent-claim-graphic, is obtained from the description content by the guidance target of the structural patent-claim-graphic, by utilizing the processor, the guidance target drawing content, when the illustration data is the structural patent-claim-graphic, is obtained by the structural graphic element number of the structural patent-claim-graphic and/or the description element number corresponding to the component element noun to obtain, from the description content, a corresponding drawing number corresponding to the structural graphic element number and/or the description element number such that the guidance target drawing content corresponding to the corresponding drawing number is obtained, and by utilizing the processor, the guidance target element number, when the illustration data is the drawing, is obtained by collecting all description element numbers in a paragraph of the description content where the corresponding drawing number is located.

In one embodiment of the present invention, the guidance content automatic obtaining and displaying equipment is provided that wherein the guidance content is displayed in a marked manner to display in the patent document content.

In one embodiment of the present invention, the guidance content automatic obtaining and displaying equipment is provided that wherein, when the illustration data is the drawing, the drawing element number of the drawing and/or the claim element noun corresponding to the drawing element number are/is displayed as the guidance target together with the drawing.

In one embodiment of the present invention, the guidance content automatic obtaining and displaying equipment is provided that wherein the guidance content displaying device includes a guidance content selecting sub-device, the guidance content selecting sub-device is provided with a guidance content selecting interface which is configured to select the guidance target in the guidance content selecting interface to display the guidance content corresponding to the guidance target.

In one embodiment of the present invention, the guidance content automatic obtaining and displaying equipment is provided that wherein only the paragraph with the guidance target is displayed as the guidance target description content, and the paragraph without the guidance target is not displayed as the guidance target description content.

In one embodiment of the present invention, the guidance content automatic obtaining and displaying equipment is provided that wherein, when the illustration data is the drawing, the drawings are displayed sequentially according to the amount of the claim element nouns belonging to each drawing.

In one embodiment of the present invention, the guidance content automatic obtaining and displaying equipment is provided that wherein the illustration data and the guidance content corresponding to the guidance target are displayed in one displaying screen simultaneously.

In one embodiment of the present invention, the guidance content automatic obtaining and displaying equipment is provided that wherein when the claim element noun of the claims content and/or a claim interrelationship of the claims content are/is used as the guidance target, and the guidance content displaying device displays the guidance target drawing content corresponding to the guidance target and/or the guidance target description content corresponding to the guidance target.

The guidance content automatic obtaining and displaying equipment of the present invention has the following effects the guidance content automatic obtaining and displaying equipment of the present invention could help a patent reader to systematically, comprehensively, fastly, and correctly read patent documents so as to browse more patent documents in the same time. The present invention could automatically obtain a guidance content corresponding to illustration data for the illustration data including a drawing or a structural patent-claim-graphic, based on the illustration data of patent documents, and display an illustration data and a guidance target of the illustration data, such as an element number or an element noun. The effect of reading the illustration data and the guidance target on the same page is that the patent readers can intuitively select the guidance target for the guidance target of the illustration data and display, in the same page or different pages, the guidance content corresponding to the guidance target and the illustration data to patent readers. The method is the most efficient way for patent reading, and enables patent readers to read patent quickly, efficiently, and correctly. The guidance content corresponding to the graphic information is intuitively read such that patent readers can quickly understand and correctly analyze the content of the patent document based on the direct and visual illustration data of the present invention.

BRIEF DESCRIPTION OF THE DRAWINGS

FIG. 6 is a schematic diagram illustrating a word separating rule table of the guidance content automatic obtaining and displaying equipment according to the embodiment of the present invention;

DETAILED DESCRIPTION OF THE PREFERRED EMBODIMENTS

The preferred embodiments of the present invention are described in detail below with reference to FIG. 1 to FIG. 8. The description is used for explaining the embodiments of the present invention only, but not for limiting the scope of the claims.

Figure 2:
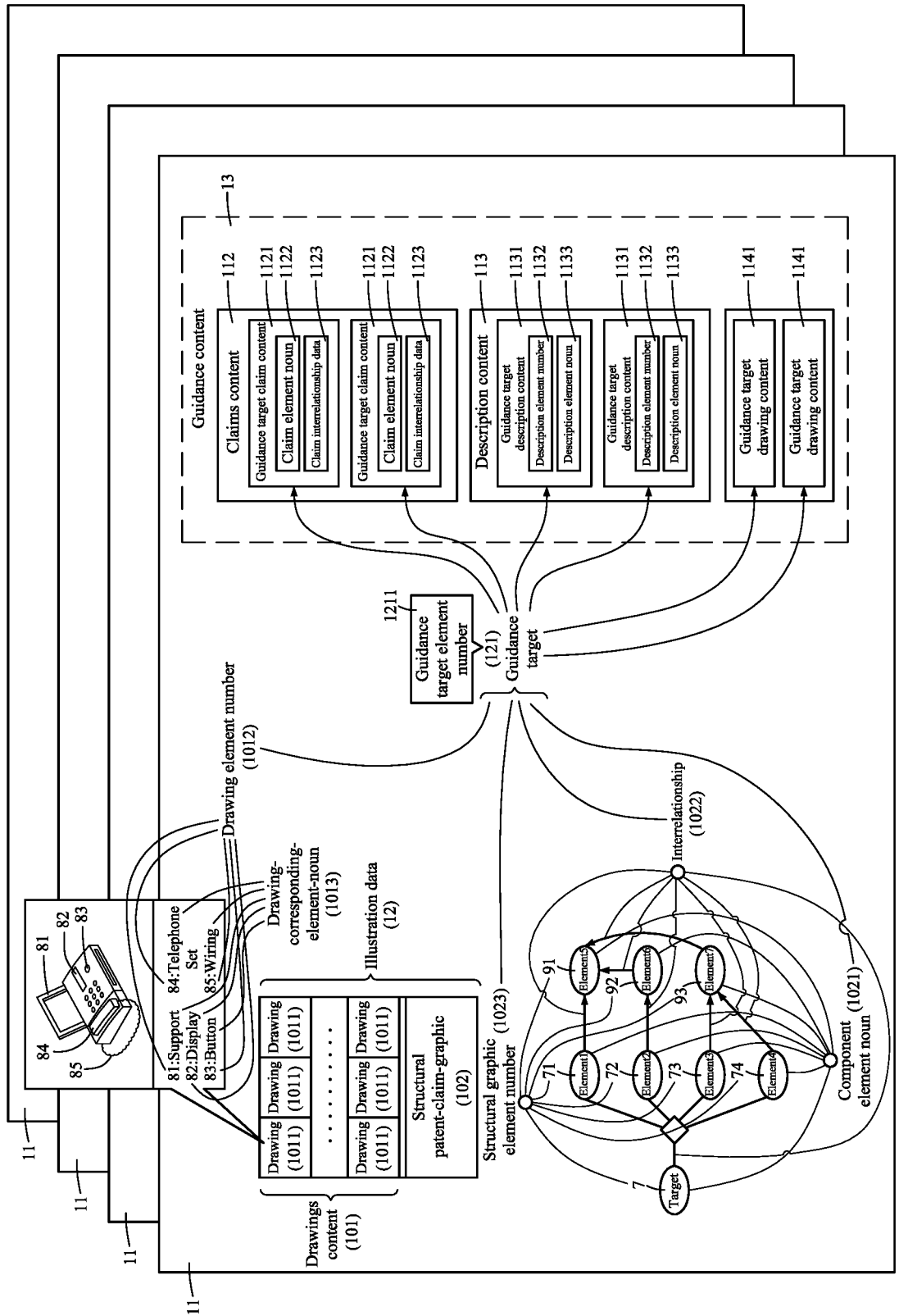
FIG. 2 is a schematic overview diagram illustrating the related data content in implementation and a relationship of the respective related data content of the guidance content automatic obtaining and displaying equipment according to the embodiment of the present invention.

As shown in FIG. 2, it illustrates all data contents and a relationship between different data contents in the guidance content automatic obtaining and displaying equipment of the present invention.

Figure 3:
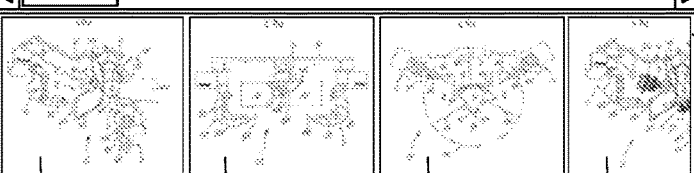
FIG. 3 is a schematic diagram illustrating a displayed screen of the guidance content automatic obtaining and displaying equipment according to the embodiment of the present invention.

As shown in FIG. 2 and FIG. 3, a patent document 11 comprises a drawings content 111, a claim content 112 and a description content 113. Each drawings content 111 contains a plurality of drawings 1111.

In one embodiment of the present invention, the present invention performs a guidance of the patent document 11 based on illustration data 12 of the patent document 11. The illustration data 12 as a guidance basis is the drawing 1111 (as shown in FIG. 4) and/or a structural patent-claim-graphic 102 (as shown m FIG. 5).

Figure 4:
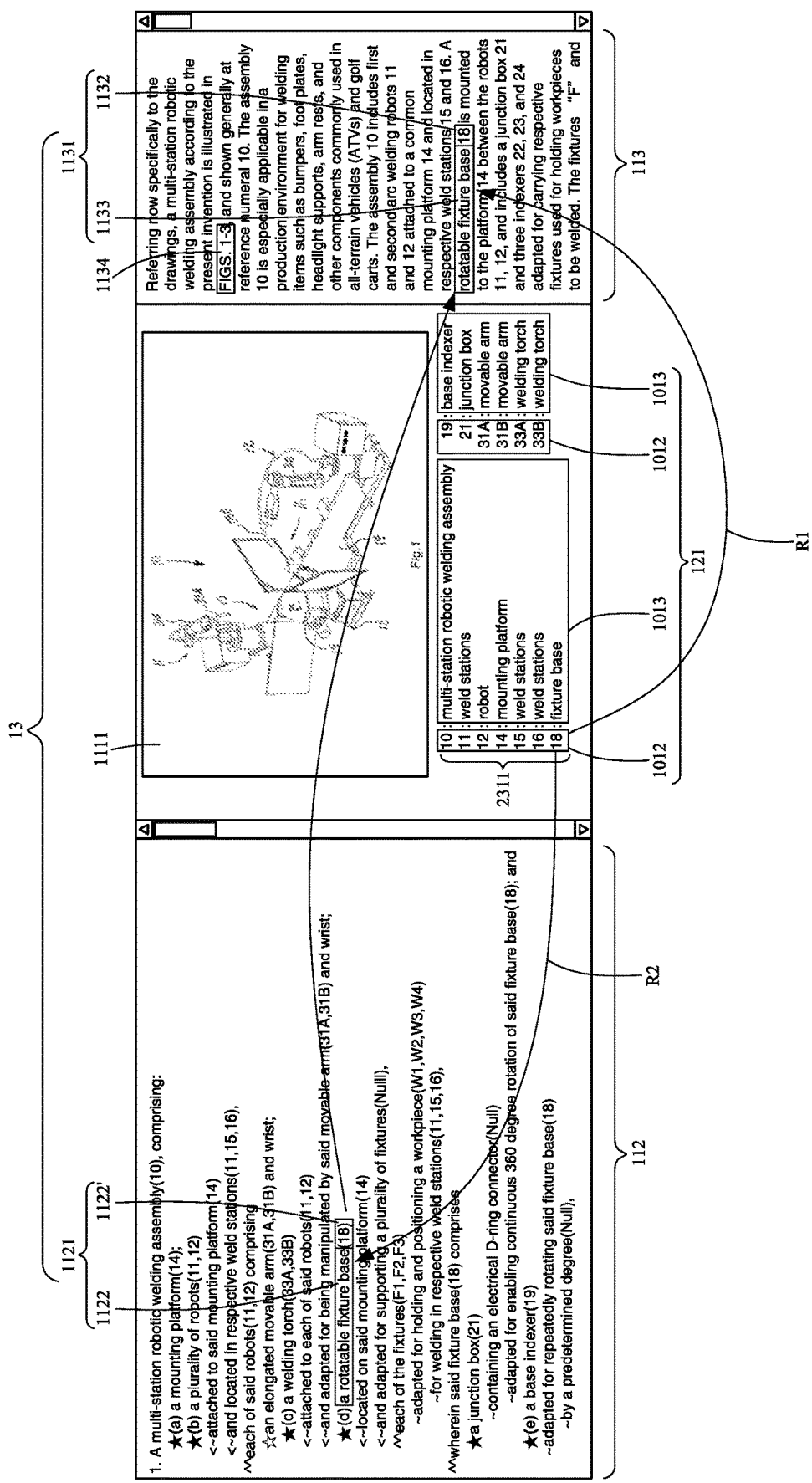
FIG. 4 is a schematic diagram illustrating another displayed screen of the guidance content automatic obtaining and displaying equipment according to the embodiment of the present invention.

In one embodiment as shown in FIG. 4 where the drawing 1111 is taken as the illustration data 12, the drawing 1111 to be firstly displayed is selected as the drawing having the most claim element nouns. For example, in FIG. 3, the claim element noun 1122 of the claims content 112 includes five claim element nouns, which are "mounting platform" having element number of 14, "robot" having element numbers of 11 and 12, "welding torch" having element numbers of 33A and 33B, "rotatable fixture base" having an element number of 18, and "base indexer" having an element number of 19. Therefore, the drawing having the most element nouns is selected as the illustration data 12 and is firstly displayed. Accordingly, the drawing 1111 having the element numbers of 11, 12, 14, 18, 19, 33A, and 33B, which corresponds to the claim element nouns, is selected as the illustration data 12 and is displayed. Furthermore, drawing element numbers 1012 and/or drawing-corresponding-element-nouns 1013 of the drawing 1111 are displayed on a screen together with the drawing 1111, wherein the drawing element numbers 1012 and/or the drawing-corresponding-element-nouns 1013 are displayed below the drawing 1111, as shown in FIG. 4.

In detail, please refer to FIG. 2 and FIG. 4. When the illustration data 12 is the drawing 1111, the present invention displays the drawing element number 1012 of the drawing 1111 and also displays the drawing-corresponding-element-nouns 1013 corresponding to the drawing element number 1012 on a basis of the drawing 1111. The displayed drawing element numbers 1012 corresponding to the drawing 1111 and/or the displayed drawing-corresponding-element-nouns 1013 corresponding to the drawing element numbers are used as a guidance target 121 such that a user could select the drawing element numbers 1012 or the drawing-corresponding-element-nouns 1013 corresponding to the drawing element numbers 1012. Then a corresponding content corresponding to the drawing element numbers 1012 and a corresponding content corresponding to the drawing-corresponding-element-nouns 1013 are marked in the claims content 112 and/or the description content 113 as a guidance content 13, wherein the guidance content 13 corresponding to the guidance target 121 in the claims content 112 is called a guidance target claim content 1121, the guidance content 13 corresponding to the guidance target 121 in the description content 113 is called a guidance target description content 1131, and the guidance content 13 corresponding to the guidance target 121 in the drawings content 101 is called a guidance target drawing content 1141, not shown in FIG. 4.

Figure 5:
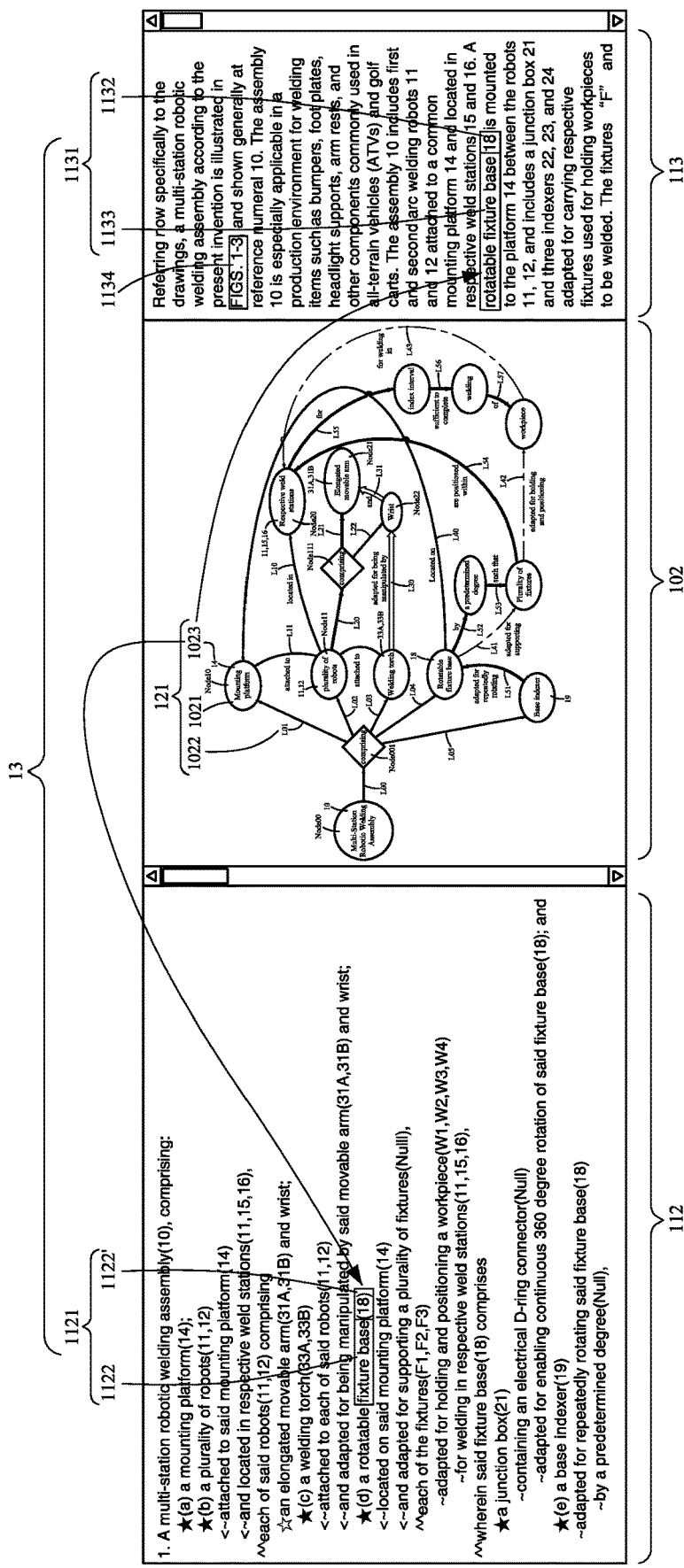
FIG. 5 is a schematic diagram illustrating another displayed screen of the guidance content automatic obtaining and displaying equipment according to the embodiment of the present invention.

Please refer to FIG. 2 and FIG. 5. When the illustration data 12 is the structural patent-claim-graphic 102, the present invention will display guidance targets 121 of the structural patent-claim-graphic 102, including component element nouns 1021 and/or interrelationships 1022 and/or structural graphic element numbers 1023 belonging to the structural patent-claim-graphic 102, to which a user could select any one of the guidance targets.

Figure 7:
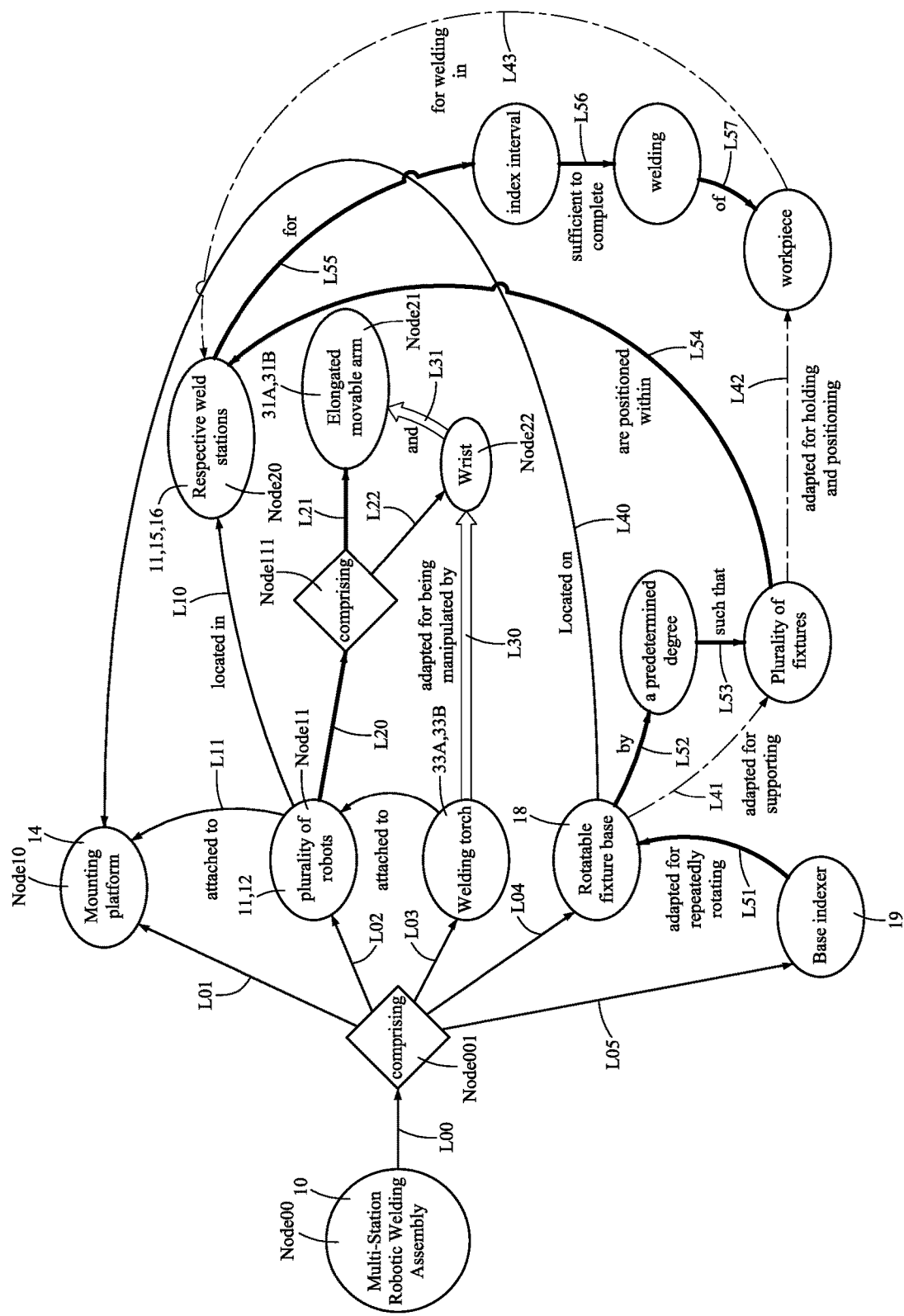
FIG. 7 is a schematic diagram illustrating a structural patent-claim-graphic of the guidance content automatic obtaining and displaying equipment according to the embodiment of the present invention.

As shown in FIG. 7, the structural patent-claim-graphic 102 is a structural graphic prepared in advance on which all element nouns, element numbers, and the interrelationships of the claim contents 112 are illustrated. The automatic obtaining method will be described later.

The guidance content 13 could be the claims content 112 and/or the description content 113 and/or the drawings content 111. The claims content 112, the description content 113 and the drawings content 111 are found with guidance content 13 which corresponds to the component element noun 1021, the interrelationship 1022 and the structural graphic element number 1023 of the structural patent-claim-graphic 102 respectively. In other words, the guidance content 13 in the claims content 112 found corresponding to the guidance target 121 is called a guidance target claim content 1121. The guidance content 13 in the description content 113 found corresponding to the guidance target 121 is called a guidance target description content 1131. The guidance content 13 in the drawings content 111 found corresponding to the guidance target 121 is called a guidance target drawing content 1141.

As shown in FIG. 2, FIG. 4, and FIG. 5, in one embodiment of the present invention, a guidance content automatic obtaining and displaying equipment 1 utilizes a processor to automatic obtain a guidance content 13 of illustration data 12 of a patent document 11, and the guidance content 13 is then displayed. The patent document content 11 includes a claim content 112, a drawings content 111, and a description content 113. The drawing content 111 includes at least one drawing 1111. The illustration data 12 is a drawing 1111 and/or a structural patent-claim-graphic 102. The guidance content 13 is a content corresponded to a guidance target 121 of the illustration data 12. The guidance content 13 could be a guidance target claim content 1121 and/or a guidance target description content 1131 and/or a guidance target drawing content 1141. The guidance target 121 illustrated on the drawing 1111 could be a drawing element numbers 1012 and/or a drawing-corresponding-element-nouns 1013. The guidance target 121 of the structural patent-claim-graphic 102 could be a component element noun 1021 and/or an interrelationship 1022 and/or a structural graphic element number 1023.

Figure 1:
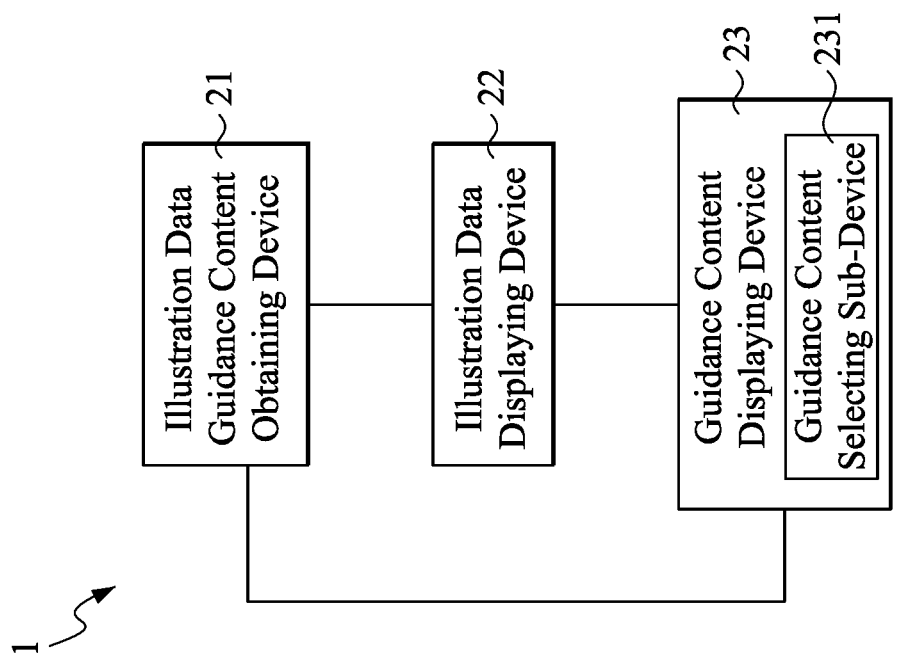
FIG. 1 is a schematic block diagram illustrating a guidance content automatic obtaining and displaying equipment according to one embodiment of the present invention.

As shown in FIG. 1, the guidance content automatic obtaining and displaying equipment 1 of the present invention comprises: an illustration data guidance content obtaining device 21 configured to utilize the processor to obtain the guidance content 13 which corresponds to the guidance target 121 of the illustration data 12. The illustration data guidance content obtaining device 21 is a sequence of codes, which is performed by a processor to fetch the guidance content 13 storing in a guidance content database, not shown. The guidance content 13 is data pre-stored in a storage place including hard disk, server, etc. The guidance content 13 is previously classified as the guidance target claim content 1121 and/or the guidance target description content 1131 and/or the guidance target drawing content 1141 such that the guidance content 13 could be the guidance target claim content 1121 and/or the guidance target description content 1131 and/or the guidance target drawing content 1141. The processor performs the code relating to the illustration data guidance content obtaining device 21 to starting a data fetching operation, by which the guidance content 13 is obtained by the processor from the storage place where the guidance content 13 is stored. After the guidance content 13 is obtained by the processor from the storage place, the guidance content 13 is stored in a memory connecting to the processor through a data bus. The guidance content 13 thereafter is ready to be accessed by the following procedures. The guidance content automatic obtaining and displaying equipment 1 of the present invention further comprises an illustration data displaying device 22, which is a display and is configured to utilize the processor to fetch the illustration data from the memory and display the illustration data 12 as a displaying graphic, on which the guidance target 121 is displayed. The guidance content automatic obtaining and displaying equipment 1 of the present invention further comprises a guidance content displaying device 23 which is connected to the illustration data guidance content obtaining device 21 and the illustration data displaying device 22. The guidance content displaying device 23 is an I/O device and its output device is a display configured to utilize the processor to fetch the guidance content from the memory and display the guidance content 13. The guidance content 13 is content found corresponding to the guidance target 121 belonging to the illustration data 12. The guidance content 13 could be the guidance target claim content 1121 and/or the guidance target description content 1131 and/or the guidance target drawing content 1141.

The present invention simultaneously displays the illustration data 12 and the guidance targets of the illustration data 12 on a screen to enable patent readers to visually and intuitively read the patent document and select the guidance target. Patent readers can understand what the guidance targets 121 of the illustration data 12 are such that the patent readers could obtain the guidance content 13 corresponding to respective guidance targets 121. Therefore, the present invention achieves the purpose of quickly and correctly reading the patent documents by means of understanding the detail of the visual illustration data in a convenient way.

In one embodiment, patent readers can acquire the guidance content 13 corresponding to the guidance target 121 by clicking on one of respective guidance targets 121. However, the present invention is not limited to this, the present invention can also provide all the guidance contents 13 corresponding to the guidance targets 121 without the necessity of clicking the guidance target 121 by patent readers.

By utilizing the processor, the guidance target claim content 1121 is obtained by, when the illustration data 12 is the drawing 1111, (1) obtaining a claim element noun 1122 of the claims content 112, based on a word separating rule as shown in FIG. 5 and a part-of-speech of the claims content 112, (2) obtaining a description element number 1132 which corresponds to the claim element noun 1122 from the description content 113, (3) obtaining a guidance target element number 1211 (which is the drawing element number in the drawing 1111, and is the structural graphic element number 1023 in the structural patent-claim-graphic 102) from the guidance target 121, (4) obtaining guidance-target-to-description-element-number-relationship R1 between the guidance target element number 1211 and the description element number 1132, and (5) obtaining a drawing-to-claim-relationship R2 between the guidance target element number 1211 and the claim element noun 1122 based on the guidance-target-to-description-element-number-relationship R1 such that the guidance target claim content is obtained.

In the present invention, the claim element noun 1122 is obtained from the claims content 112 according to a part-of-speech and a word separating rule, as shown in FIG. 6. The referred embodiment is described as follows.

In the word separating rule BR of the present invention, a plurality of part-of-speech databases are utilized. The word separating rule BR applies the sequential relationship between/among the plurality of word databases, as shown in FIG. 6, to determine an element-noun ending position. The plurality of part-of-speech databases include: a noun-initial word database, a relative pronoun database, a subordinating verb database, a participle (Ved) database, a participle (Ving) database, a preposition database and a sentence separating symbol database.

The noun-initial word database includes: "A", "a", "An", "an", "The", "the", "Said", "said", "at least one", "at least two", etc.

The relative pronoun database includes: "which", "whose", "where", "wherein", "where", etc., the subordinating verb database includes: "is", "are", "was", "were", etc.

The participle (Ved) database includes: "the word of 'provided' or ending with 'ed' or 'en' (the collection of the words is adjustable)", etc.

The participle (Ving) database includes: "the word of 'providing' or ending with 'ing' (the collection of the words is adjustable)", etc.

The preposition database includes "with", "to", "in", "on", "at", "over", "above", "below", "along", "through", "via", "within", "onto", etc.

The word separating symbol database includes various punctuations.

In FIG. 6, the words of the claim content 112 are sequentially read. In FIG. 6, when a noun initial word such as "A", "a", "The", "the", "Said", "said", "at least one", and "at least two" defined in the noun-initial word database is read, the noun initial word is labeled with a mark such as "○" in FIG. 3 such that the word is taken as a noun initial word, and the reading is continued to determine the element-noun ending position. The present invention applies a mechanism that determines whether a read word is an element-noun-possible-ending word. If it is, the position of the read word is marked with the "●" mark as shown in FIG. 6, and the reading is continued to read an element-noun-possible-ending-confirmation word. If the element-noun-possible-ending-confirmation word is found, which is indicated in FIG. 6 with another "●" mark in the same row, the element-noun-possible-ending noun will be determined as an element-noun-ending word by which the words from the noun initial word to the element-noun-ending word is the element noun. There are two situations while the element-noun-ending word is determined, including:

Situation (1), a direct determining situation: for example, in the rows numbered 1, 2, 3, and 12 of the word separating rule table, there is not mark "○" in the right side of the mark "●", which indicates the element-noun-ending word can be directly determined as word indicated with mark "○" such that the words from the noun-initial to the word prior to the element-noun-ending word represented by "○" is an element noun. That is, in the rows numbered 1, 2, and 3, after the "noun-initial" is obtained, when the word belonging to any one of the "relative pronoun database", the "subordinating verb database" the "preposition database" is obtained, which are all indicated with mark "●" without any mark "○" followed thereafter, the word is determined as an element-noun-ending word.

Situation (2), an indirect determining situation: in the rows numbered 4-11 of the word separating rule table BR, they are rows having a mark "○" in the right side of the mark "●" in the same row. The mark "●" represents a "possible element-noun-ending position", which indicates the word position still could not be determined as the "element noun ending position" unless a word represented by "○" following the "possible element-noun-ending position" is found. For example, in the rows numbered 4-8, after the word of "noun-initial" is obtained and then the reading is continued to read the word belonging to "the participle (Ved) database" marked with "●", the present invention has to continuously read the word belonging to databases marked with "○" including "the participle (Ving) database", "the preposition database", "the noun-initial database", "the relative pronoun database", the participle (Ved) and the participle (Ving)" to determine that the "possible element-noun-ending position" could be turned to the element-noun ending position. For another example, in the rows numbered 9-11, when the word belonging to "the preposition database" is obtained, the position of the word is indicated by "●" and the reading is continued to read. When the word belonging to "the noun-initial database", "the relative pronoun database", "the participle (Ved) database" or "the participle(Ving) database is identified as indicated with "○", it means that the position of "the preposition database" is turned from "a possible element-noun-ending position" to "an element-noun-ending position.

The follows take a sentence "a circuit board provided with an edge extending in a longitudinal direction;" as an example to explain how the claim element noun 1122 is obtained according to the word separating rule in connection to the word database.

(1) First, the word "a" is read from the sentence "[a] circuit board provided with an edge extending in a longitudinal direction;", which is indicated as the word bracketed by "[ ]". Because the word of "a" belongs to the "noun-initial database", the reading is continued for reading the next word;

(2) Next, the word "circuit" is read from "a [circuit] board provided with an edge extending in a longitudinal direction;", and since the "circuit" does not belong to any word database, the reading is continued for reading the next word;

(3) Next, the word "board" is read from "a circuit [board] provided with an edge extending in a longitudinal direction;", and since the "board" does not belong to any database, the reading is continued for reading the next word;

(4) Next, the word "provided" is read from "a circuit board [provided] with an edge extending in a longitudinal direction;", and since the "provided" is identified as belonging to the participle (Ved) database, therefore according to the word separating rule, the rows numbered 4-8 will be taken into consideration such that the position of "provided" is noted with "●" and is determined as a possible word separating position, and the reading is continued for reading the next word to determine whether the position of "provided" could be further determined as an element-noun-ending position;

(5) Next, the word "with" is read from "a circuit board provided [with] an edge extending in a longitudinal direction;", and since the "with" is identified as belonging to the preposition database, therefore according to the word separating rule, the row numbered "4" would be taken into consideration in which its column position indicates that it belongs to the preposition database by being noted with "○". Therefore, it turns the possible word separating position to be the element noun ending position. That is, the "circuit board" prior to the element-noun-ending position is determined as an element noun, and the reading is continued for reading the next word;

(6) Next, the word "an" is read from "a circuit board provided with [an] edge extending in a longitudinal direction;", and since the "an" is identified as belonging to "the noun-initial database", the reading is continued for reading the next word;

(7) Next, the word "edge" is read from "a circuit board provided with an [edge] extending in a longitudinal direction;", and since the "edge" does not belong to any database, the reading is continued for reading the next word;

(8) Next, the word "extending" is read from "a circuit board provided with an edge [extending] in a longitudinal direction;", and since the "extending" is identified as belonging to the participle (Ving) database, the position of "extending" is noted with "●" and is determined as a possible word-separating position, and the reading is continued for reading the next word to determine whether the position of "extending" could be further determined as an element-noun-ending position;

(9) Next, the word "in" is read from "a circuit board provided with an edge extending [in] a longitudinal direction;", and since the "in" is identified as belonging to the preposition database, the row numbered 4 would be taken into consideration in which its column position indicates that it belongs to the preposition database by being noted with "○". Therefore, it turns the possible word separating position to be the element noun ending position. That is, "an edge", which is a portion prior to the element-noun-ending position noted with "●", is determined as an element noun, and the reading is continued for reading the next word;

(10) Next, the word "a" is read from "a circuit board provided with an edge extending in [a] longitudinal direction;", and since the "a" is identified as belonging to the noun-initial database, the reading is continued for reading the next word;

(11) Next, the word "longitudinal" is read from "a circuit board provided with an edge extending in a [longitudinal] direction;", and since the "longitudinal" does not belong to any database, the reading is continued for reading the next word;

(12) Next, the word "direction" is read from "a circuit board provided with an edge extending in a longitudinal [direction];", and since the "direction" does not belong to any database, the reading is continued for reading the next word;

(13) Next, the symbol ";" is read from "a circuit board provided with an edge extending in a longitudinal direction[;]", and since the symbol ";" is identified as a punctuation mark belonging to the symbol word separating database, the position of ";" is determined as an element-noun-ending position and "a longitudinal direction", which is a portion prior to the element-noun-ending position noted with "●", is determined as an element noun.

According to the above, the obtained element nouns are bracketed by "[ ]" as follows: "[a circuit board] provided with [an edge] extending in [a longitudinal direction];".

After the claim element noun 1122 is obtained, the words connecting between two claim element nouns 1122 will be determined as the claim interrelationship data 1123.

For example, in the aforementioned claims content 112 of "[a circuit board] provided with [an edge] extending in [a longitudinal direction];", the words between two claim element nouns 1122 are determined as the claim interrelationship data 1123. Accordingly, the claim interrelationship data 1123 are determined including "provided with", which is between "an circuit board" and "an edge", and "extending in" which is between "an edge" and "a longitudinal direction"

Figure 8:
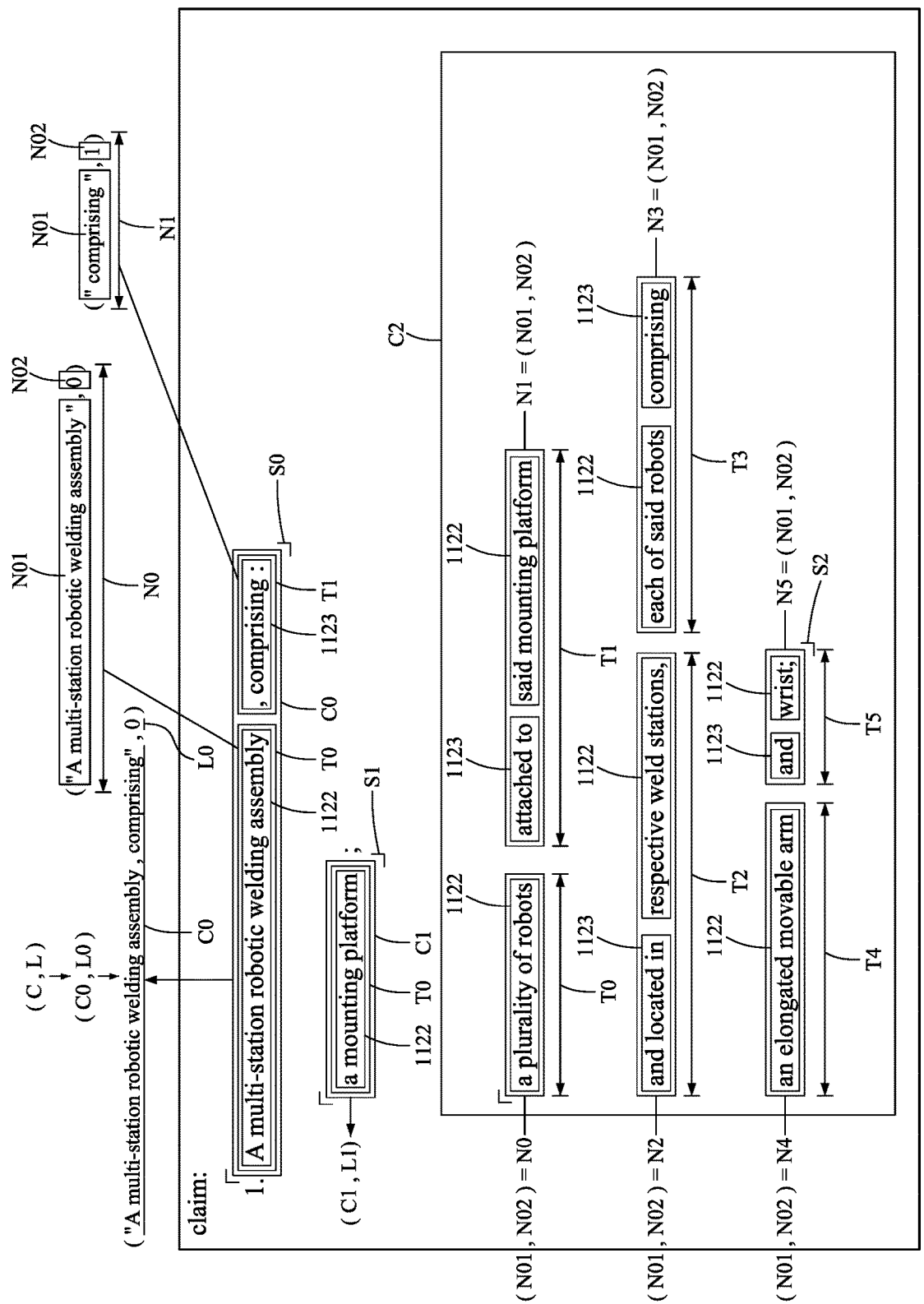
FIG. 8 is a schematic diagram illustrating a claim content.

The following describes how to obtain the structural patent-claim-graphic 102. As shown in FIG. 8, a plurality of paragraphs S are provided in the claims content 112, wherein each paragraph S includes the paragraph content C and a corresponding paragraph hierarchical level value L to which the paragraph content C belongs. For example, a preamble (paragraph S0), which is a top portion of the claim, has a paragraph content C0 of "A multi-station robotic welding assembly, comprising:", and has the paragraph hierarchical level value L0 of 0 since "A multi-station robotic welding assembly, comprising:" is a preamble. With regard to the paragraph S1, a paragraph content C1, which is with content of "a mounting platform;". In the patent claim HTML-text, the paragraph S0 and paragraph S1 has been hierarchically displayed in such a manner that the paragraph S1 is configured to be the next hierarchical level of the paragraph S0. Therefore, the paragraph hierarchical level value L1 of the paragraph content C1 is determined as 1. In detail, in a file of HTML format of the patent claim HTML-text, all paragraph are separated by "<div>" and "</div>". The following example shows three paragraphs being separated by "<div>" and "</div>".

"<div> A multi-station robotic welding assembly, comprising:
  <div> a mounting platform; </div>
  <div> a plurality of robots attached to said mounting platform and located in respective weld stations, each of said robots comprising an elongated movable arm and wrist. </div></div>"

In the process of obtaining the structural patent-claim-graphic 102, "<div>" and "</div>" are applied to divide the first paragraph S0, the second paragraph S1, and the third paragraph S2 to respective hierarchical levels. When reading the claims content 112, the present invention, by the use of "<div>" and "</div>", determines the paragraph hierarchical level value L of each paragraph content C. Accordingly, the paragraph hierarchical level value L1 of the paragraph content C1 is determined as 1. The paragraph S2, whose paragraph content C2 is "a plurality of robots attached to said mounting platform and located in respective weld stations, each of said robots comprising an elongated movable arm and wrist;" is with the paragraph hierarchical level value L2 of 1 since "</div>" is appeared at the end of the paragraph S1. That is to say, the paragraph hierarchical level value L of each paragraph content C is determined according to the appearing position of "<div>" and "</div>".

After the paragraph content C of each paragraph S and the paragraph hierarchical level value L of each paragraph content C are obtained, the claim element noun 1122 and the claim interrelationship data 1123 of each paragraph content C are obtained in the aforementioned manner of obtaining the claim element noun 1122.

As shown in FIG. 8, after the claim element noun 1122 and the claim interrelationship data 1123 are obtained, a division content N (N0 and N1, that is, each division T is defined with a division content N) of a division T (for example, C0 is defined with two divisions T0 and T1, C1 is defined with a division T0, and C2 is defined with two divisions T0 and T1) of each paragraph content C in the claims content 112 is obtained. One or more division contents N are obtained by dividing each paragraph content C, wherein each division content N, for example, "A multi-station robotic welding assembly", includes a division data content N01 which is "A multi-station robotic welding assembly" and a division data hierarchical level value N02 which is zero), and the result of "("A multi-station robotic welding assembly", 0)" is obtained. For another example, ", comprising:" includes a division data content N01 which is ", comprising:" and a division data hierarchical level value N02 which is 1, and the result of "(", comprising:", 1)" is obtained. The division data content N01 is a combination of the claim element noun 1122 and/or the claim interrelationship data 1123.

In FIG. 8, for example, there are three paragraphs S provided, including paragraph S0, paragraph S1, and paragraph S2. The paragraph S0 has a paragraph content C0 of "A multi-station robotic welding assembly, comprising:". The paragraph S1 has a paragraph content C1 of "a mounting platform;". The paragraph S2 has a paragraph content C2 of "a plurality of robots attached to said mounting platform and located in respective weld stations, each of said robots comprising an elongated movable arm and wrist;". The following explanation is made by taking the paragraph S2 as an example.

The paragraph content C2 of the paragraph S2 is "a plurality of robots attached to said mounting platform and located in respective weld stations, each of said robots comprising an elongated movable arm and wrist;". Based on the rules of "enabling the claim element noun 1122 to be existed alone", "enabling one claim element noun 1122 to be behind one claim interrelationship data 1123" and "combining some specific interrelationship data 1123 such as a subordinating interrelationship, i.e., 'comprising' and 'and' to the previous claim element noun 1122", the paragraph content C2 is divided to a plurality of divisions T0 ("a plurality of robots"), T1 ("attached to said mounting platform and"), T2 ("located in respective weld stations,"), T3 ("each of said robots comprising"), T4 ("an elongated movable arm and"), and T5 ("wrist;").

Further, each division content N is obtained from the division T (T0, T1, T2, T3, and T4), that is, each division T is with its division content N. The division content N is defined with a division data content N01 and a division data hierarchical level value 1412. For example, each division content N0, N1, N2, N3, N4 and N5, which respectively corresponds to divisions T0, T1, T2, T3, T4 and T5, is a combination of the division data content N01 and the division data hierarchical level value N02, wherein N0 is defined as "{"a plurality of robots", 0}", N1 is defined as "{"attached to", "said mounting platform", 1}", N2 is defined as "{"and located in", "respective weld stations,", 1}", N3 is defined as "{"each of said robots", "comprising", 0}", N4 is defined as "{"an elongated movable arm", 1}", and N5 is defined as "{"and", "wrist;", 1}" in which "a plurality of robots" for N0 is the division data content N01, and "0" for N02 is the division data hierarchical level value N02; "attached to" and "said mounting platform" for T1 are the division data content N01, and "1" for N1 is the division data hierarchical level value N02; "and located in" and "respective weld stations" for N2 are the division data content N01, and "1" for N2 is the division data hierarchical level value N02; "each of said robots" and "comprising" for N3 are the division data content N01, and "0" for N3 is the division data hierarchical level value N02; "an elongated movable arm" for N4 is the division data content N01, and "1" for N4 is the division data hierarchical level value N02; "and" and "wrist;" for N5 are the division data content N01, and "1" for N5 is the division data hierarchical level value N02. The division data content N01 is the combination of the claim element noun 1122, and the claim interrelationship data 1123. That is, the obtained result is "{ [ {"a plurality of robots", 0}, {"attached to", "said mounting platform", 1}, {"and located in", "respective weld stations," 1}, {"each of said robots", "comprising", 0}, {"an elongated movable arm", 1}, {"and", "wrist," 1}], 1]] ".

The division data hierarchical level value N02 is obtained by following the rule that "the division data hierarchical level value N02 is generally increasing by 1 with the level adding of the division hierarchy". However, for division contents with the subordinating claim interrelationship data 1123 from "comprising" to "and", or between the "comprising" and "and" (for example, N4 and N5), or for the matching interrelationship data (for example, N1 and N2, in which the "and" in N2 is matched with N1), only the division data hierarchical level value N02 of the first division is increased by 1 but the division data hierarchical level value N02 of all remaining divisions keep the same as that of the first division (that is, the division data hierarchical level value N02 of other divisions is not increased by 1 except the first division). Furthermore, when "wherein" is identified, the division data hierarchical level value N02 is reset to zero. In conclusion, one paragraph S is dismantled to a plurality of divisions T, and each division content N is obtained from each division T according to the positional sequence of each division T. Each division content includes the division data content N01 and the division data hierarchical level value N02. After each division T and division content N are obtained, a log file is obtained from a combination of these division contents N in sequence and the division hierarchical level value L.

Therefore, the contents of the paragraph S0, the paragraph S1, and the paragraph S2 are obtained in sequence and are recorded in the log file. Next, the structural patent-claim-graphic 102 is formed according to the log file.

As shown in FIG. 7, in the beginning, a node Node00 is created for the paragraph content of the paragraph S0 ([[{"a multi-station robotic welding assembly", "comprising,", 0}], 0]]). Then, according to the subordinating claim interrelationship data 1123, a node Node001 is created and a connecting line L00 is connected between the node Node00 and the node Node001 in a direction from the node Node00 to the node Node001, i.e., a direction of the connection line is determined by the connection line direction determining device according to a relationship represented by the connection among the interrelationship data and the element noun data to which the connection line is connected.

Next, a determination for the paragraph S1 is operated. The paragraph content of the paragraph S1 is recorded as below.

"[[{"a mounting platform;", 0}], 0] H".

The paragraph hierarchical level value of the paragraph S1 is found as 0, and the paragraph S1 is started with the claim element noun 1122 having a beginning word "a". Based on the reason that the beginning word for the paragraph belonging to the subordinating relationship should not be any words of "the", "said", or "wherein", the present invention searches for the nearest previous paragraph having paragraph hierarchical level value equal to the paragraph hierarchical level value of the current paragraph minus 1. After it is found, we determine whether the end of the found paragraph is a claim interrelationship 1123 ("comprising"). If all the above condition are all met, we determine the nearest previous paragraph as a starting point of the claim interrelationship 1123 "comprising", which is the node Node001. Then, the first division data content of "a mounting platform;" is grabbed to create a node Node10 having the first division data content "a mounting platform" to be written. The punctuation ";" in the end of the paragraph S1 indicates the end of the paragraph such that a determination for next paragraph is continued Next, the recording of paragraph S2 is performed. The paragraph content of the paragraph S2 is as follows: "[[{" a plurality of robots", 0}, {" attached to", "said mounting platform", 1}, {"and located in", "respective weld stations,", 1}, {"each of said robots", "comprising", 0}, {"an elongated movable arm", 1}, {"and", "wrist,", 1}], 1]] ".

First, the paragraph hierarchical level value is found as 1, i.e. "1" is located in the end of the paragraph content. In the paragraph content of the paragraph S2, the firstly read division data content, i.e., {"a plurality of robots", 0}, is with a claim element noun 1122 starting with "a". In addition, there does not have a paragraph with paragraph content starting with the words of "the", "said", or "wherein" existing between the paragraph content of the paragraph S2 and its afore-existing subordinating paragraph content such as "comprising". Thereafter, the present invention searches the nearest afore-existing paragraph having paragraph hierarchical level value equal to the paragraph hierarchical level value of the current paragraph minus 1. Then the present invention checks whether the found paragraph is with a claim interrelationship data 1123, i.e., "comprising" in the end of the found paragraph or not. If all the above condition are met, the claim interrelationship data 1123, i.e., "comprising" in the end of the found paragraph is determined as a starting point, which is the node Node001. The division data content of "a plurality of robots" in the first division content N0 is grabbed to create a node Node 11 having the division data content "a plurality of robots", and a connection line L02 is obtained to connect from the starting point Node001 to the node Node 11.

Next, a determination for the second division content N1 {"attached to", "said mounting platform", 1} of the paragraph S2 is operated. First, the division hierarchical level value is found as 1, which is found as the division hierarchical level value of the preceding division plus 1 such that it represents the second division N1 is with one degree lower hierarchical level than the preceding division N0. Then, the preceding division N0 is taken as a starting point of the connection line to the second division N1. Thereafter the present invention determines whether the claim element noun 1122 in the division data content N1 has already defined. Since the claim element noun 1122 "said mounting platform" has be defined in the node Node10, the present invention determines that a connection line L11 is with a direction from the node Node11 to the node Node10. In addition, the claim interrelationship 1123 of the division data content, i.e., "attached to", is attached on the connection line L11. A first color is used to mark the connection line L11, and the connection line L11 is with direction arrow from the node Node11 to the node Node10 as shown in FIG. 7

Next, a determination for the third division content, i.e., {"and located in", "respective weld stations,", 1}, of the paragraph S2 is operated. First, the division hierarchical level value is found as 1, which is found as the same as the division hierarchical level value of the preceding division. Then, the present invention determines there is a matching relationship between the third division and the preceding paragraph such that the claim element noun 1122 of the preceding division is not taken as the starting point, and the nearest division having division hierarchical level value which is the same as the division hierarchical level value of the current division minus 1 is taken as the starting point. Thereafter, the present invention searches for the node of the claim element noun 1122 of the division having division hierarchical level value equal to zero as a starting point, which is the node Node11, and the present invention determines whether the claim element noun 1122, which is "respective weld stations", of the division data content N1 has already defined before. If the present invention determines the claim element noun 1122 of the division data content does not exist, a node Node20 of the claim element noun 1122 is created and a connection line L10 is obtained to connect from the starting point Node11 to the node Node20. The first color is used to mark the connection line L10, and the connection line L10 is with direction arrow from the node Node11 to the node Node20.

Next, a determination for the fourth division content, i.e., {"each of said robots", "comprising", 0}, of the paragraph S2 is operated. First, in the reading of the division data content "each of said robots", "said robots" is read such that it represents "robot" has appeared in the preceding content. Therefore, the node Node 11 is obtained by searching the node of "robot". The division data of the following division, which is "comprising", is obtained by taking the node Node11 as the starting point of a connection line L20. Due to the particularity of "comprising", a node Node111 of the "comprising" is created and the connection line L20 is obtained to connect from the starting point Node11 to the node Node111 with marked direction and color.

Next, a determination for the fifth division content, i.e., {"an elongated movable arm", 1}, of the paragraph S2 is operated. First, the paragraph hierarchical level value is found as 1, and the claim element noun 1122 thereof is found with a beginning word "a". In addition, there does not have a division, having division content starting with the words of "the", "said", or "wherein", existing between the division content of the fifth division and its afore-existing subordinating division content, i.e., "comprising". Thereafter, the present invention searches for the nearest afore-existing division having division hierarchical level value equal to the division hierarchical level value of the current paragraph minus 1, and therefore the fourth division is found. Then, the present invention determines whether the found division, i.e., the four division, is with the claim interrelationship 1123, i.e., "comprising" in the end of the found division or not. It is found all the above conditions are met. Therefore, the claim interrelationship 1123, i.e., "comprising" in the end of the found division is determined as a starting point, which is a node Node 111. Then, the first division data content "an elongated movable arm" is grabbed to create a node Node21 having the first division data content "an elongated movable arm". A connection line L21 is obtained to connect from the starting point Node111 to the node Node21. Thereafter the determination continues.

Next, a determination for the sixth division content, i.e., ⟨{"and", "wrist,", 1}], 1⟩, of the paragraph S2 is operated. First, the paragraph hierarchical level value is found as 1, and the sixth division content is started with the claim element noun 1122 with a beginning word "and" followed by a word other than "the", or "said". In addition, there does not have a division, having division content starting with the words of "the", "said", or "wherein", existing between the division content of the sixth division and its afore-existing subordinating division content, i.e., "comprising". Thereafter, the present invention searches for the nearest afore-existing division having division hierarchical level value equal to the division hierarchical level value of the current division minus 1 (the fifth division). Then, the present invention determines whether the found division is with the claim interrelationship 1123, i.e., "comprising" in the end of the found division or not. It is found that all the above conditions are met. Therefore, the claim interrelationship 1123. i.e., "comprising" in the end of the found division is determined as a starting point, which is the node Node111. Then, the division data not including the word of "and" is grabbed to create the node Node22 having the division data content "wrist". A connection line L22 is obtained to connect from the starting point Node 111 to the node Node22, and the semicolon (";") behind "wrist" is obtained so as to determine that the reading of the paragraph is ended and a determination for the new paragraph is operated.

According to the above method, the structural patent-claim-graphic 102 in FIG. 7 is obtained, and the structural patent-claim-graphic 102 has a hierarchical structure and hierarchical position relationship.

As shown in FIG. 4, after the claim element noun 1122 (i.e., "rotatable fixture base") is obtained from the claim content 112, by the claim element noun 1122 (i.e., "rotatable fixture base"), a description element noun 1133 (i.e., "rotatable fixture base") corresponding to the claim element noun 1122 (i.e., "rotatable fixture base") is obtained from the description content 113, an element number (i.e., 18) followed by the description element noun 1133 (i.e., "rotatable fixture base") is obtained as the drawing element numbers 1012 of the drawing 1111, the description element noun 1133 is determined as the drawing-corresponding-element-nouns 1013 of the drawing, and the drawing element numbers 1012 and/or the drawing-corresponding-element-nouns 1013 can be determined as the guidance target 121 corresponding to the drawing 1111 in such a manner as to obtain the guidance target 121 of the drawing 1111. At this time, the guidance-target-to-description-element-number-relationship R1 between the guidance target "including the drawing element numbers 1012 (i.e., 18) and/or the drawing-corresponding-element-nouns 1013 (i.e., "rotatable fixture base")" corresponding to the description element number 1132 (i.e., 18) is obtained such that a drawing-to-claim-relationship R2 between the guidance target 121 and the claim element noun 1122 is obtained by the guidance-target-to-description-element-number-relationship R1. Therefore, when patent readers select the guidance target 121 (which is the drawing element numbers 1012, e.g., 11, in the drawing 1011, and is the component element noun 1021, the interrelationship 1022 or the structural graphic element number 1023 in the structural patent-claim-graphic 102), the guidance target claim content 1121 is obtained.

As shown in FIG. 4, after the claim element noun 1122 (i.e., "robot") is obtained from the claim content 112, the present invention uses the claim element noun 1122 (i.e., "robot") to obtain a description element noun 1133 (i.e., "robot") corresponding to the claim element noun 1122 (i.e., "robot") from the description content 113. Next, an element number followed by the description element noun 1133 (i.e., "robot") is obtained as the drawing element number 1132 (i.e., 11). After the description element number 1132 (i.e., 11) is obtained from the description content 113, the present invention uses the description element number 1132 (i.e., 11) to obtain the drawing element numbers 1012 (i.e., 11) corresponding to the description element number 1132 (i.e., 11) from the drawing 1011. That is to say, the guidance-target-to-description-element-number-relationship R1 between the guidance target 121 and the description element number 1132 is obtained such that a drawing-to-claim-relationship R2 between the guidance target 121 and the claim element noun 1122 is obtained based on the guidance-target-to-description-element-number-relationship R1. Therefore, when patent readers select the guidance target 121 (which is the drawing element numbers 1012, e.g., 11, in the drawing 1011 and is the component element noun 1021, the interrelationship 1022 or the structural graphic element number 1023 in the structural patent-claim-graphic 102), the guidance target claim content 1121 is obtained.

As shown in FIG. 5, by utilizing the processor, the guidance target claim content 1121, when the illustration data 12 is the structural patent-claim-graphic 102, is obtained from the claims content 112 by the guidance target 121 (i.e., the component element noun 1021 and/or the interrelationship 1022 and/or the structural graphic element number 1023) of the structural patent-claim-graphic 102.

As shown in FIG. 5, by utilizing the processor, the guidance target claim content 1121, when the illustration data 12 is the structural patent-claim-graphic 102, is obtained from the claims content 112 by the guidance target 121 (i.e., the component element noun 1021 and/or the interrelationship 1022 and/or the structural graphic element number 1023) of the structural patent-claim-graphic 102.

As shown in FIG. 4, by utilizing the processor, the guidance target description content 113, when the illustration data 12 is the drawing 1011, is obtained by the guidance-target-to-description-element-number-relationship R1 between the guidance target 121 (at this time, the guidance target 121 is the drawing element number 1012) and the description element number 1132.

By utilizing the processor, the guidance target description content 1131, when the illustration data 12 is the structural patent-claim-graphic 102, is obtained from the description content by the guidance target 121 (i.e., the component element noun 1021 and/or the interrelationship 1022 and/or the structural graphic element number 1023) of the structural patent-claim-graphic 102.

As shown in FIG. 3 and FIG. 5, the procedures of obtaining the guidance target drawing content 1141 are illustrated and are explained, when the illustration data 12 is the structural patent-claim-graphic 102, as follows. The guidance targets 121 of the structural graphic element number (i.e., the component element noun 1021 and/or the structural graphic element number 1023) are used to obtain the description element number 1132 corresponding to the component element noun 1021 and/or the structural graphic element number 1023. Next, a corresponding drawing number 1134 is obtained from the description content 113 by using the description element number 1132. Next, the guidance content 13 (i.e., the guidance target drawing content 1141) corresponding to the corresponding drawing number 1134 is obtained from the corresponding drawing number 1134. The corresponding drawing number 1134 is obtained as shown in FIG. 5. In the description content 113, the paragraph with the description element number 1132 (for example, 10, which represents the description element noun 1133 of assembly) is found with the description of FIGS. 1 to 3 (i.e., " . . . is illustrated in FIGS. 1-3, . . . "). Therefore, the description element number 1132 is found with its corresponding drawing number of FIG. 1, FIG. 2, and FIG. 3. As a result, all description element numbers 1132 belonging to each drawing are obtained.

The procedures of obtaining the drawing element number 1012 for being taken as the guidance target 121 is explained, when the illustration data 12 is the drawing 1011, as follows. The present invention scans all drawings to obtain how many drawings amount is/are for each drawing page, while the drawing number, i.e., the number 3 of FIG. 3, and total amount of drawings are obtained from "BRIEF DESCRIPTION OF THE DRAWINGS" such that each drawing is designated with a drawing number. Therefore the description element numbers 1132 belonging to a paragraph of the description content having the drawing number, i.e., the number 3 of FIG. 3, are collected as belonging to the drawing number, i.e., the number 3 of FIG. 3 in such a manner that the description element numbers 1132 are taken as the drawing element number 1012 of the guidance target 121.

As shown in FIG. 4 and FIG. 5, according to the guidance content automatic obtaining and displaying equipment 1 of one embodiment of the present invention, the guidance content 13 is displayed in a mark-up manner to display in the patent document content. The mark-up manner could be a font reverse manner, a bottom line manner or any other mark-up manner.

As shown in FIG. 4, according to the guidance content automatic obtaining and displaying equipment 1 of one embodiment of the present invention, when the illustration data 12 is the drawing 1011, the drawing element number 1012 of the drawing 1011 and the claim element noun corresponding to the drawing element number 1012 are displayed.

As shown in FIG. 1 and FIG. 4, according to the guidance content automatic obtaining and displaying equipment 1 of one embodiment of the present invention, the guidance content displaying module includes a guidance content selecting sub-device 231, wherein the guidance content selecting sub-device 231 is an input device belonging to the I/O device (i.e., the guidance content displaying module 23) and is provided with a guidance content selecting interface 2311 which is an input interface configured to select the guidance target 121 displayed on the guidance content selecting interface 2311 to display the guidance content 13 corresponding to the guidance target 121.

As shown in FIG. 4 and FIG. 5, according to the guidance content automatic obtaining and displaying equipment 1 of one embodiment of the present invention, only the paragraph with the guidance target 121 is displayed as the guidance target description content 113, and the paragraph without the guidance target 121 is not displayed as the guidance target description content 113. That is, the description content is concisely displayed.

As shown in FIG. 4 and FIG. 5, according to the guidance content automatic obtaining and displaying equipment 1 of one embodiment of the present invention, when the illustration data 12 is the drawing 1011, the drawings 1011 are displayed sequentially according to the amount of the claim element nouns 1122 belonging to each drawing 1011. That is, the amount of the claim element nouns 1122 belonging to each drawing 1011 is counted such that a plurality of the drawing are sorted in such a manner that the drawing 1011 having the most claim element nouns 1122 is displayed in a higher priority than others.

As shown in FIG. 4 and FIG. 5, according to the guidance content automatic obtaining and displaying equipment 1 of one embodiment of the present invention, the illustration data 12 and the guidance content 13 corresponding to the guidance target 121 are displayed in one displaying screen simultaneously.

As shown in FIG. 4, the claim element noun 1122 of the claims content 112 and/or the claim interrelationship 1123 of the claims content 112 are/is used as the guidance target 121, and are/is displayed on a screen by the guidance content displaying device 23. The drawing 1011 corresponding to the guidance target 121 could be displayed by selecting the guidance target 121 operated by patent readers, and the drawing element number 1012 of the drawing 1011 and the drawing-corresponding-element-nouns 1013 are displayed on a screen to enable the drawing element number 1012 and the drawing-corresponding-element-nouns 1013 to be used as the guidance target 121 in such a manner that patent readers can select the drawing element number 1012 and the drawing-corresponding-element-nouns 1013 again to perform another guidance operation. In particular, after the claim element noun 1122 used as the guidance target 121 and/or the claim interrelationship 1123 are/is selected, all drawings 1011 corresponding to the claim element noun 1122 and/or the claim interrelationship 1123 could be obtained. Therefore, patent readers can repeatedly perform guidance operation among the drawing 1011, the structural patent-claim-graphic 102, and the claims content 112 which is the guidance target claim content 1121.

The above description should be considered only as an explanation of the preferred embodiment of the present invention. A person with ordinary skill in the art can make various modifications to the present invention based on the scope of the claims and the above description. However, those modifications shall fall within the scope of the present invention.

What is claimed is:

1. A guidance content automatic obtaining and displaying equipment that utilizes a processor to automatic obtain a guidance content of illustration data of a patent document to display the guidance content, the patent document content including a claim content, a drawings content, and a description content, the drawing content including at least one drawing, the illustration data being a drawing or a structural patent-claim-graphic, the guidance content being corresponded to a guidance target of the illustration data, the guidance content being a guidance target claim content or a guidance target description content or a guidance target drawing content, the guidance content automatic obtaining and displaying equipment comprising:

an illustration data guidance content obtaining device configured to utilize the processor to obtain the guidance content which corresponds to the guidance target of the illustration data, the guidance content being the guidance target claim content or the guidance target description content or the guidance target drawing content;

an illustration data displaying device configured to utilize the processor to display the illustration data as a displaying graphic and display the guidance target of the illustration data in such a manner that when the illustration data is the drawing, the guidance target is a drawing element number or a drawing-corresponding-element-noun which corresponds to the drawing element number, and when the illustration data is the structural patent-claim-graphic, the guidance target is a component element noun or an interrelationship or a structural graphic element number; and a guidance content displaying device which is connected to the illustration data guidance content obtaining device and the illustration data displaying device, the guidance content displaying device being configured to utilize the processor to display the guidance content which corresponds to the guidance target, and the guidance content being the guidance target claim content or the guidance target description content or the guidance target drawing content, wherein, by utilizing the processor, the guidance target claim content is obtained by, when the illustration data is the drawing, sequentially (1) obtaining a claim element noun from the claims, content by determining a noun initial word of the claim element noun and an element-noun-ending word of the claim element noun based on a word separating rule and a part-of-speech of the claims content, (2) obtaining a description element number which corresponds to the claim element noun from the description content based on the claim element noun, (3) obtaining a guidance target element number, which corresponds to the description element number, from the guidance target based on the description element number, (4) obtaining a guidance-target-to-description-element-number-relationship between the guidance target element number and the description element number based on the guidance target element number and the description element number, and (5) obtaining a drawing-to-claim-relationship between the guidance target element number and the claim element noun based on the guidance-target-to-description-element-number-relationship such that the guidance target claim content is obtained, by utilizing the processor, the guidance target claim content, when the illustration data is the structural patent-claim-graphic, is obtained from the claims content by the guidance target of the structural patent-claim-graphic, by utilizing the processor, the guidance target description content, when the illustration data is the drawing, is obtained by the guidance-target-to-description-element-number-relationship between the guidance target element number and the description element number, by utilizing the processor, the guidance target description content, when the illustration data is the structural patent-claim-graphic, is obtained from the description content by the guidance target of the structural patent-claim-graphic, by utilizing the processor, the guidance target drawing content, when the illustration data is the structural patent-claim-graphic, is obtained by the structural graphic element number of the structural patent-claim-graphic or the description element number corresponding to the component element noun to obtain, from the description content, a corresponding drawing number corresponding to the structural graphic element number or the description element number such that the guidance target drawing content corresponding to the corresponding drawing number is obtained, and by utilizing the processor, the guidance target element number, when the illustration data is the drawing, is obtained by collecting all description element numbers in a paragraph of the description content where the corresponding drawing number is located, wherein the structural patent-claim-graphic is obtained by sequentially (i) obtaining a paragraph content and a paragraph hierarchical level value from the claim content based on a division symbol, (ii) obtaining a division and a division data hierarchical level value from the paragraph content based on the division symbol, (iii) obtaining the component element noun and the interrelationship from the division to obtain the paragraph hierarchical level value, the division data hierarchical level value and an in-front-of-or-behind relationship for each component element noun and each interrelationship, and (iv) accordingly constructing the structural patent-claim-graphic containing the component element noun, the interrelationship, the paragraph hierarchical level value of the component element noun, the division data hierarchical level value of the component element noun, the paragraph hierarchical level value of the interrelationship and the division data hierarchical level value of the interrelationship.

2. The guidance content automatic obtaining and displaying equipment as claimed in claim 1, wherein the guidance content is displayed in a marked manner to display in the patent document content.

3. The guidance content automatic obtaining and displaying equipment as claimed in claim 1, wherein, when the illustration data is the drawing, the drawing element number of the drawing or the claim element noun corresponding to the drawing element number is displayed as the guidance target together with the drawing.

4. The guidance content automatic obtaining and displaying equipment as claimed in claim 1, wherein only the paragraph with the guidance target is displayed as the guidance target description content, and the paragraph without the guidance target is not displayed as the guidance target description content.

5. The guidance content automatic obtaining and displaying equipment as claimed in claim 1, wherein, when the illustration data is the drawing, the drawings are displayed sequentially according to the amount of the claim element nouns belonging to each drawing.

6. The guidance content automatic obtaining and displaying equipment as claimed in claim 1, wherein the illustration data and the guidance content corresponding to the guidance target are displayed in one displaying screen simultaneously.

7. The guidance content automatic obtaining and displaying equipment as claimed in claim 1, wherein when the claim element noun of the claims content or a claim inter-relationship of the claims content is used as the guidance target, and the guidance content displaying device displays the guidance target drawing content corresponding to the guidance target or the guidance target description content corresponding to the guidance target.

* * * * *